United States Patent Office 3,121,225
Patented Feb. 11, 1964

3,121,225
HIGH ALTITUDE AIRSPEED INDICATOR
Gus Stavis, Briarcliff Manor, N.Y., assignor to General
Precision, Inc., a corporation of Delaware
Filed May 10, 1962, Ser. No. 194,752
10 Claims. (Cl. 343—8)

This invention relates to aircraft and spacecraft airspeed indicators for use at high altitudes.

Conventional airspeed indicators generally employ the pitot tube principle. This principle fails for high speed measurement at high altitudes because the air pressure is too low for precise measurements and because shock waves prevent sampling of undisturbed air. Another principle of operation must therefore be employed at high altitudes.

This invention has for one of its purposes the measurement of airspeed at all altitudes but particularly at altitudes at which conventional airspeed indicators are inoperative.

Another purpose of this invention is to provide an improved wind speed indicator for use at the surface of the earth.

Still another purpose of this invention is to provide an improved instrument for wind tunnel measurements of airspeed and air turbulence.

The principles employed by this invention include the reflection of microwave radiations from a cloud of ionized air. Even though air at high altitudes is too rare to operate a pitot tube airspeed indicator, it may be quite dense enough to form an ionized cloud which will reflect microwave radiant energy. Density sufficient for this purpose exists above the earth to an altitude of at least 300,000 feet.

In one mode of operation of this invention a pair of high voltage conductors are made to project ahead of the nose of the craft or vehicle with their tips ahead of any shock wave caused by the nose of the craft. A potential difference is applied between the two conductors sufficient to cause ionization of the air between their tips. A low power microwave transmitter in the nose of the aircraft directs microwave radiation forward so that it is reflected back from the cloud of ionized air between the two conductor tips. This microwave reflection or echo signal contains Doppler information because it is reflected from the cloud of relatively stationary ionized atoms or molecules. The reflected microwave radiation is received at the craft and, from the Doppler information which it contains, there is secured an indication representing the speed of the craft relative to the undisturbed air through which it is about to pass.

In another embodiment the high voltage ionization method is replaced by a microwave ionization method, in which a beam of microwave radiation is focused on a spot ahead of the craft. This beam must be powerful enough to cause ionization and may be employed also as the transmitter beam of the microwave Doppler system.

In still another embodiment a single powerful but unfocused beam of microwave is beamed ahead and range gating principles are employed to eliminate reflections from ionized air within any shock wave or disturbed air which may be in the beam path.

A further understanding of this invention may be secured from the detailed description and associated drawings, in which.

Figure 1:
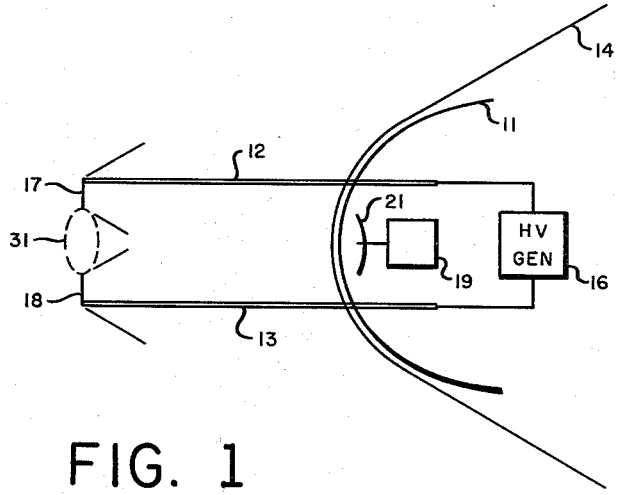
FIGURE 1 is a diagram of an embodiment of the invention employing high potential to generate an ionized cloud.

Referring now to FIGURE 1, a high speed spacecraft 11 is assumed to be flying at an altitude of 250,000 feet and at a speed of Mach 2. A pair of electrically conducting rods, 12 and 13, project ahead of the craft far enough that their tips are well ahead of the shock wave 14 pushed ahead by the nose of the craft. The rods 12 and 13 are connected at their rear ends within the craft to a high voltage generator 16. The forward tips, 17 and 18, of the rods are bent so that, when a potential difference is applied between the rods, breakdown or ionization of the air occurs at the tips. A microwave transmitter-receiver, 19, and its antenna, 21, are positioned in the nose of the craft so as to radiate a beam of microwave energy forward and toward the space between the rod tips 17 and 18, and to receive echoes therefrom. The nose of the craft ahead of the antenna 21 is fitted with a faired radome which is transparent to microwave energy. The microwave transmitter power can be small of the order of one milliwatt. The microwave receiver is adapted to receive echoes of the transmitted beam and to derive and indicate Doppler frequency information therefrom.

Figure 2:
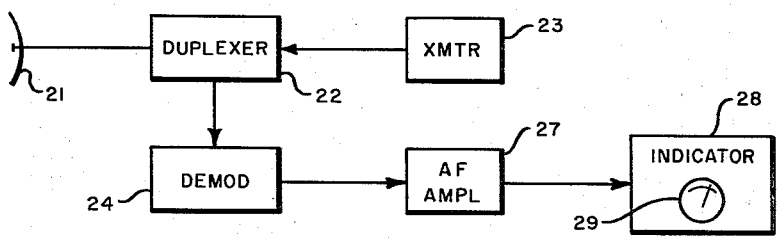
FIGURE 2 is the block diagram of a microwave system used in connection with the apparatus of FIGURE 1.

A general diagram of a simple transmitter-receiver suitable for use in connection with the apparatus in FIGURE 1 is shown in FIGURE 2. A beam antenna 21 is connected through a duplexer 22 to a low-power microwave transmitter 23. The duplexer received signal output is connected to a demodulator 24 of a suitable type, which demodulates the signal frequency to the Doppler frequency in the audio range. The demodulator output is amplified in an audio frequency amplifier 27 and the output, consisting of the Doppler frequency spectrum, is applied to an indicator 28, which may, for example, consist of an axis-crossing counter. The output appears on a dial 29, which may be calibrated directly in knots airspeed.

In the operation of the system of FIGURES 1 and 2, the craft airspeed, $V_a$, has the direct relation to the Doppler frequency difference, $f_D$, of $$V_a = k f_D \qquad (1)$$

The term $k$ is the calibration constant. The Doppler frequency, $f_D$, is $$f_D = \frac{2 V_a f_t}{c} \cos \gamma \qquad (2)$$

in which $V_a$ is the aircraft velocity relative to the ionized air mass, or airspeed, $f_t$, is the microwave transmitter frequency, and $c$ is the speed of microwave radiant energy. The angle $\gamma$ is the angle between the craft velocity vector and the direction to the reflective ionized air volume. This term, $\cos \gamma$, can be taken as unity when the craft is stabilized to its environment. The airspeed then is $$V_a = k f_D = \frac{c}{2 f_t} f_D \qquad (3)$$

As the craft moves ahead, that portion of the air mass 31 instantaneously existing ahead of the craft shock wave 14 and substantially clear of the small shock waves generated by the tips 17 and 18 is ionized to form a target area. The microwave beam transmitted from the antenna 21 toward the target area 31 is generally reflected from it because of its then ionized condition and the reflected wave is received by the receiver portion of the transmitter-receiver 19. The received signal is demodulated by the demodulator 24, FIGURE 2, to produce an alternating current signal having a frequency, $f_D$, in the audio range which is the difference between the transmitted microwave frequency and the received microwave frequency, higher because of the Doppler effect. This audio signal is amplified, then its frequency is indicated, preferably by an axis-crossing counter, at the dial 29. This frequency, $f_D$, has the relation to the craft airspeed which is indicated by Equation 3.

Figure 3:
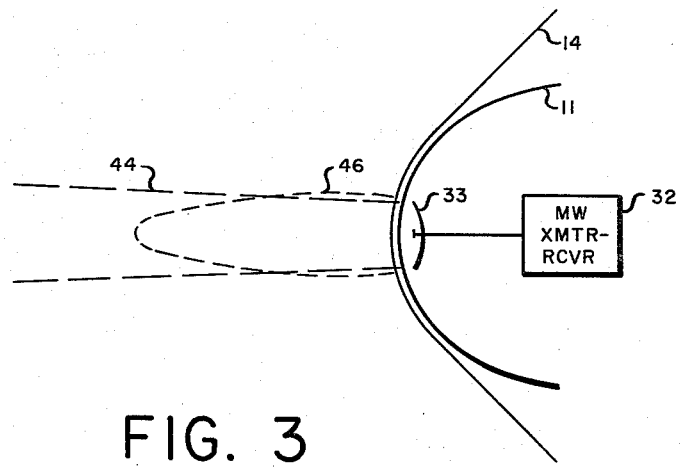
FIGURE 3 is a diagram of another embodiment of the invention employing a powerful microwave beam to generate an ionized cloud.

The cloud of ionized atoms and molecules of air can be generated in several other ways. One way is by the use of a relatively powerful microwave beam of radiation which at the same time serves as the beam of the transmitter of the Doppler microwave system. In FIGURE 3 the craft 11 contains a Doppler microwave transmitter-receiver 32 and an associated antenna 33. These components are shown in more detail in FIGURE 4. A microwave transmitter 34 is pulsed at 50 kc. by a pulse generator 36. The pulsed microwave output is applied through a duplexing circuit 37 to the antenna 33. The echoes received by the antenna form a signal applied to a demodulator 38. The output at Doppler frequency is amplified in the audio amplifier 39. This amplifier is gated off during the transmitting pulses and for a period thereafter by a gate generator 41 timed from the pulse generator 36. The output is applied to an axis-crossing counter 42, the output of which operates an indicator 43 calibrated directly in airspeed units.

Figure 4:
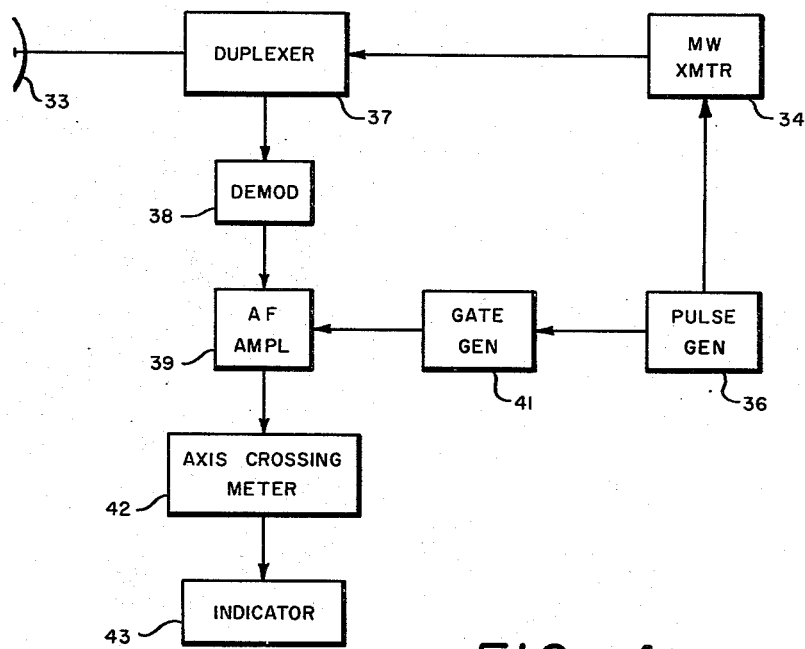
FIGURE 4 is the block diagram of a microwave system used in connection with the apparatus of FIGURE 3.

In the operation of the system of FIGURES 3 and 4, the microwave transmitter 34 emits pulses in a beam 44. This beam has a peak pulse power sufficient to ionize the air in a cloud 46 ahead of the craft and extending to the radome at the nose. Thus the cloud 46 is positioned principally ahead of the shock wave 14, but also a small part of the cloud is within the shock wave. To eliminate this part of the cloud which is within the shock wave, the receiver is time gated. It is also necessary to gate the receiver off during the transmitter pulse. These two gating functions are combined by the use of the gating generator 41. This gating generator is connected to the pulse generator 36 to start each gate at the front edge of each transmitter pulse. The gate generator is arranged to terminate its pulse approximately 0.02 microsecond after the trailing edge of the transmitter pulse. The gate is applied to the amplifier 39 to desensitize it for the duration of the gate. Thus all signals from echoes originating from less than ten feet in front of the antenna 33 are eliminated from the output of the audio amplifier 39. Since the shock wave and all disturbed air exists only within ten feet of the antenna, the received signal represents only echoes from undisturbed air in the beam 44, and the indications of the indicator 43 represent the airspeed of the craft.

Figure 5:
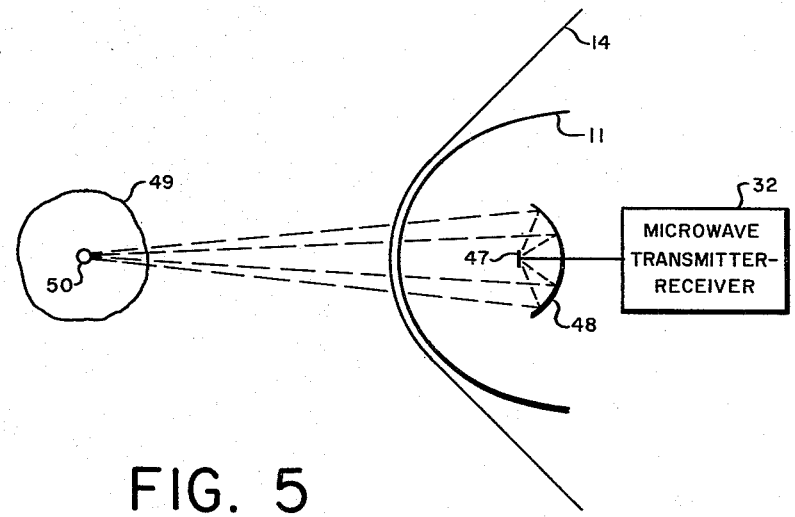
FIGURE 5 is a diagram of another embodiment of the invention employing a focused microwave beam to generate an ionized cloud in a region ahead of the vehicle.

A single focused beam can be generated by a dish antenna, focused to a single point. This is illustrated in FIGURE 5, in which the microwave transmitter-receiver 32 applies microwave transmitting energy to an antenna 47. The reflector 48, which may be paraboloidal or ellipsoidal, concentrates the radiated field in an area 49, where it causes ionization of the air in a cloud in the vicinity of the point 50. A simple receiver such as that of FIGURE 2 can be used.

What is claimed is:

1. Apparatus for indicating speed of air relative to the apparatus comprising,
   means for ionizing air to form an ionized cloud,
   means directing a beam of electromagnetic radiation at said cloud,
   means for receiving electromagnetic energy reflected from the cloud to form a received signal,
   and means deriving Doppler information representing relative speed between said cloud and said apparatus from said received signal.

2. Apparatus for indicating relative speed of air comprising,
   means for ionizing air to form an ionized cloud moving toward said apparatus,
   means directing a beam of electromagnetic radiation at said cloud and for receiving electromagnetic radiation reflected therefrom to form a received signal containing Doppler information,
   and means deriving from said Doppler information a Doppler frequency signal representing the relative speed between said cloud and said apparatus.

3. An indicator of vehicle airspeed comprising,
   means for ionizing air to form an ionized cloud,
   means directing a beam of electromagnetic radiation at said cloud,
   means for receiving the echoes thereof,
   and means deriving from said echoes Doppler frequency information representing relative speed of said vehicle and said ionized cloud.

4. An indicator of the class described comprising,
   means for ionizing air to form an ionized cloud having a velocity relative to said indicator,
   means directing a beam of electromagnetic radiation at said cloud,
   means for receiving electromagnetic radiation reflected therefrom,
   and means for deriving from said received electromagnetic radiation Doppler frequency information representing said relative velocity.

5. An indicator of the class described comprising,
   means for ionizing air to form an ionized cloud of undisturbed air having a velocity relative to said indicator,
   means directing a beam of microwave radiation at said cloud,
   means for receiving microwave radiation reflected therefrom,
   and means for deriving from said received microwave radiation Doppler frequency information representing said velocity.

6. An indicator of vehicle airspeed comprising,
   means for ionizing air to form an ionized cloud of undisturbed air ahead of said vehicle,
   means directing a beam of microwave radiation at said cloud,
   means for receiving microwave radiation reflected therefrom,
   and means for deriving from said received microwave radiation Doppler frequency information representing vehicular airspeed.

7. An indicator in accordance with claim 6 in which said means for ionizing air is a high potential electric field.

8. An indicator in accordance with claim 6 in which said means for ionizing air is a beam of microwave radiation emitted by said means directing the beam of microwave radiation.

9. An indicator in accordance with claim 6 in which said means for ionizing air is a beam of microwave radiation focused at a point ahead of any shock wave ahead of said vehicle.

10. An indicator of vehicle airspeed comprising,
    means for ionizing air to form an ionized cloud of undisturbed air ahead of said vehicle,
    a microwave transmitter,
    a microwave antenna energized thereby, said microwave antenna directing a beam of microwave radiation at said ionized cloud, said microwave antenna further receiving microwave radiation reflected from said cloud and generating a received microwave signal therefrom, a microwave receiver having said received microwave signal impressed thereon and producing Doppler frequency information representing vehicular airspeed therefrom, and means indicating airspeed operated by said Doppler frequency information.

References Cited in the file of this patent
UNITED STATES PATENTS
2,871,344    Busignies _____ June 27, 1959